US012678986B2

(12) United States Patent
Kim et al.

(10) Patent No.: US 12,678,986 B2
(45) Date of Patent: Jul. 14, 2026

(54) ELECTRODE SHEET CUTTING APPARATUS INCLUDING UPPER CUTTER AND LOWER CUTTER AND ELECTRODE SHEET CUTTING METHOD USING THE SAME

(71) Applicant: LG Energy Solution, Ltd., Seoul (KR)

(72) Inventors: Geon Ha Kim, Daejeon (KR); Tae Yoon Kong, Daejeon (KR); Tae Soon Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 328 days.

(21) Appl. No.: 17/914,023

(22) PCT Filed: May 18, 2021

(86) PCT No.: PCT/KR2021/006217
§ 371 (c)(1),
(2) Date: Sep. 23, 2022

(87) PCT Pub. No.: WO2021/235831
PCT Pub. Date: Nov. 25, 2021

(65) Prior Publication Data
US 2023/0129239 A1      Apr. 27, 2023

(30) Foreign Application Priority Data

May 20, 2020      (KR) ........................ 10-2020-0060561

(51) Int. Cl.
*B26D 1/09*          (2006.01)
*B26D 5/02*          (2006.01)
(Continued)

(52) U.S. Cl.
CPC ................. *B26D 1/09* (2013.01); *B26D 5/02* (2013.01); *B26D 7/025* (2013.01); *H01M 4/04* (2013.01); *H01M 50/531* (2021.01)

(58) Field of Classification Search
CPC . B26D 1/09; B26D 5/02; B26D 7/025; B26D 1/095; H01M 50/531; H01M 4/04;
(Continued)

(56) References Cited

U.S. PATENT DOCUMENTS

| | | | | |
|---|---|---|---|---|
| 10,122 | A | * | 10/1853 | Elder ...................... B23D 27/00 83/636 |
| 3,958,480 | A | * | 5/1976 | Rohde .................... B23D 31/04 83/237 |

(Continued)

FOREIGN PATENT DOCUMENTS

| | | |
|---|---|---|
| CN | 105406101 A | 3/2016 |
| JP | 2000141286 A | 5/2000 |

(Continued)

OTHER PUBLICATIONS

Electrode sheet (Year: 2011).*

(Continued)

*Primary Examiner* — Boyer D Ashley
*Assistant Examiner* — Fred C Hammers
(74) *Attorney, Agent, or Firm* — Lerner David LLP

(57) ABSTRACT

The present invention relates to an electrode sheet cutting apparatus including an upper cutter and a lower cutter configured to apply force to opposite surfaces of an electrode sheet while moving at the same speed, wherein the electrode sheet is cut from one side to the other side, whereby deformation of the electrode sheet is prevented and generation of foreign matter is reduced, and an electrode sheet cutting method using the same.

9 Claims, 5 Drawing Sheets

(51) Int. Cl.
 *B26D 7/02* (2006.01)
 *H01M 4/04* (2006.01)
 *H01M 50/531* (2021.01)

(58) Field of Classification Search
 CPC ...... B23D 15/06; B23D 29/00; B23D 29/026;
  B23D 29/005; B23D 33/025; B23D
  33/02; B23D 27/00; B23D 27/02; B23D
  27/04; B23D 27/06
 USPC ................................................ 83/13, 49, 237
 See application file for complete search history.

(56) References Cited

U.S. PATENT DOCUMENTS

| | | | | |
|---|---|---|---|---|
| 4,481,848 | A | * | 11/1984 | Ikeda ........................ B26D 3/14 |
| | | | | 83/692 |
| 2012/0318462 | A1 | | 12/2012 | Nagare et al. |
| 2021/0234145 | A1 | | 7/2021 | Chung |

FOREIGN PATENT DOCUMENTS

| | | | |
|---|---|---|---|
| JP | 2003117882 | A | 4/2003 |
| JP | 2011161565 | A | 8/2011 |
| JP | 2013119094 | A | 6/2013 |
| JP | 2013193201 | A | 9/2013 |
| JP | 2014010962 | A | 1/2014 |
| JP | 2015071199 | A | 4/2015 |
| JP | 2015170408 | A | 9/2015 |
| JP | 2016081742 | A | 5/2016 |
| JP | 2019212434 | A | 12/2019 |
| JP | 2020006495 | A | 1/2020 |
| KR | 20030086070 | A | 11/2003 |
| KR | 20100096018 | A | 9/2010 |
| KR | 20140119499 | A | 10/2014 |
| KR | 20160049714 | A | 5/2016 |
| KR | 20160089155 | A | 7/2016 |
| KR | 2016-0109384 | A | 9/2016 |
| KR | 101750602 | B1 | 6/2017 |
| KR | 20200008254 | A | 1/2020 |
| KR | 20200026144 | A | 3/2020 |

OTHER PUBLICATIONS

KR20200059616 Kook, et alia (Nov. 21, 2018) (MT) (Year: 2018).*
International Search Report for Application No. PCT/KR2021/006217 mailed Aug. 27, 2021, pp. 1-3.
Extended European Search Report for Application No. 21808660.1 dated Jun. 9, 2023. 6 pgs.

* cited by examiner

【FIG. 1】
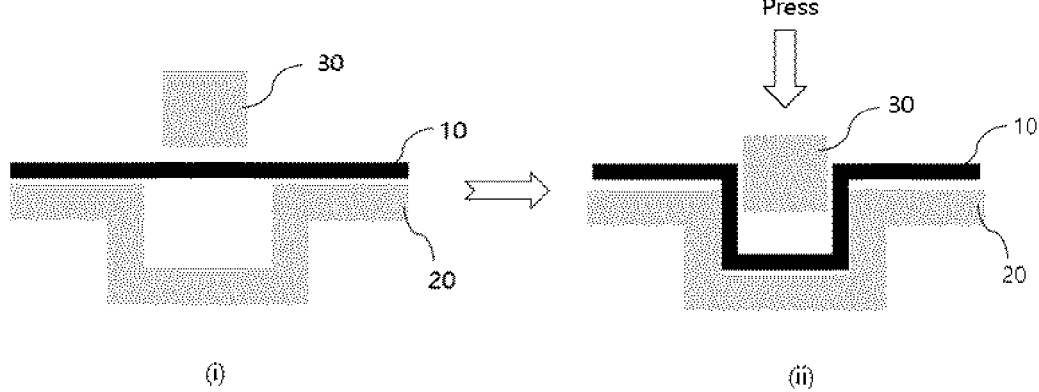
(i)          (ii)
【FIG. 2】
10
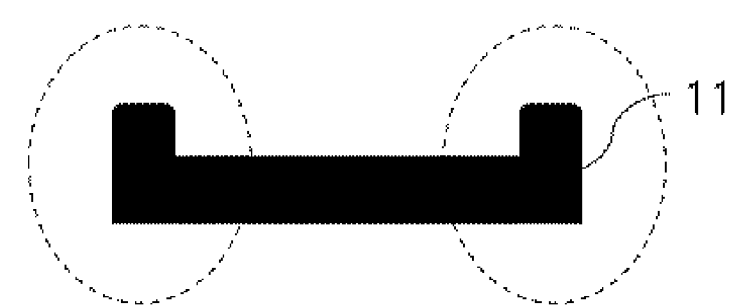

【FIG. 3】
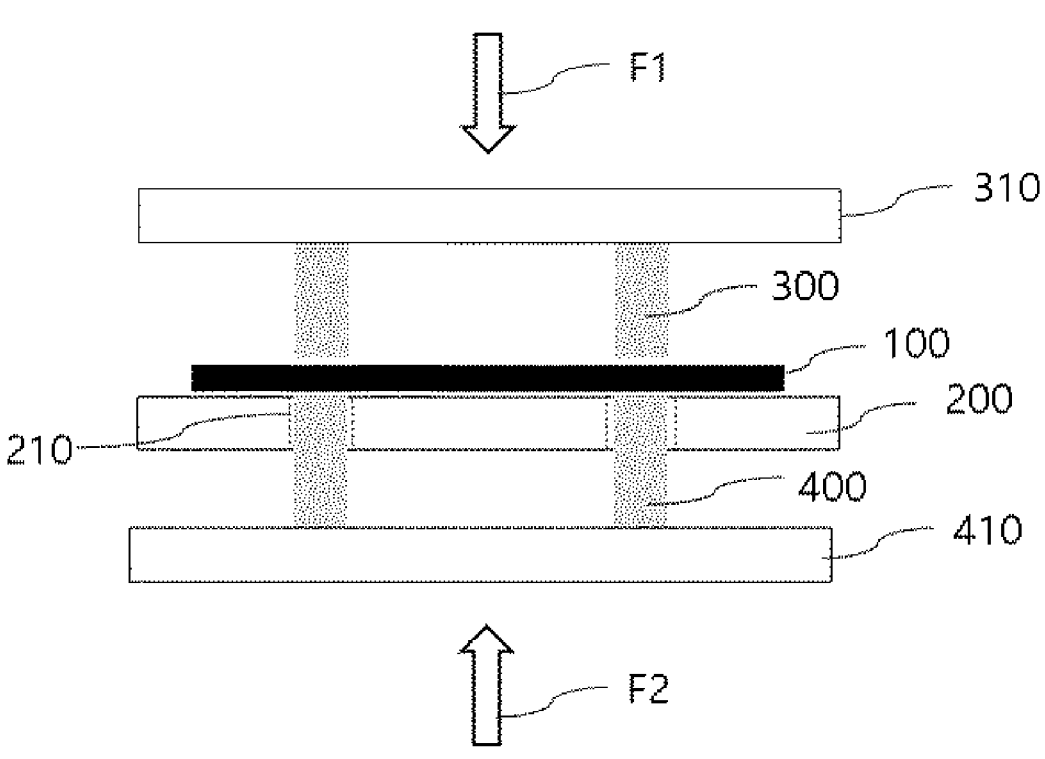
【FIG. 4】
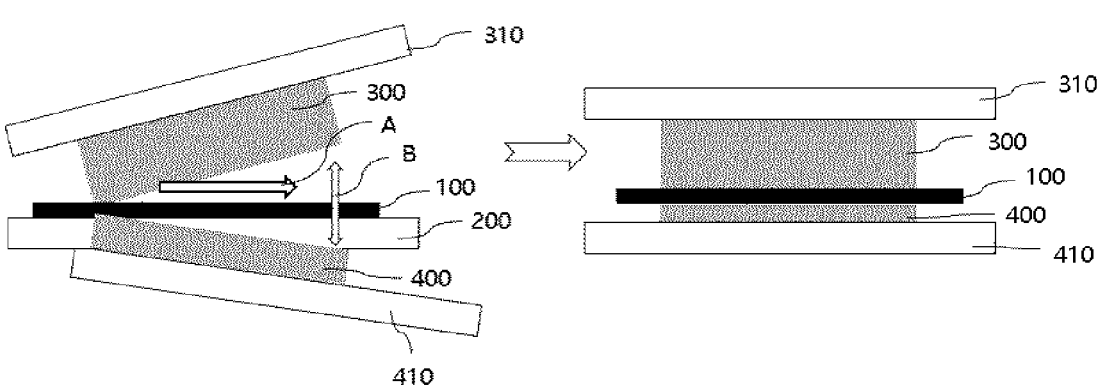

【FIG. 5】
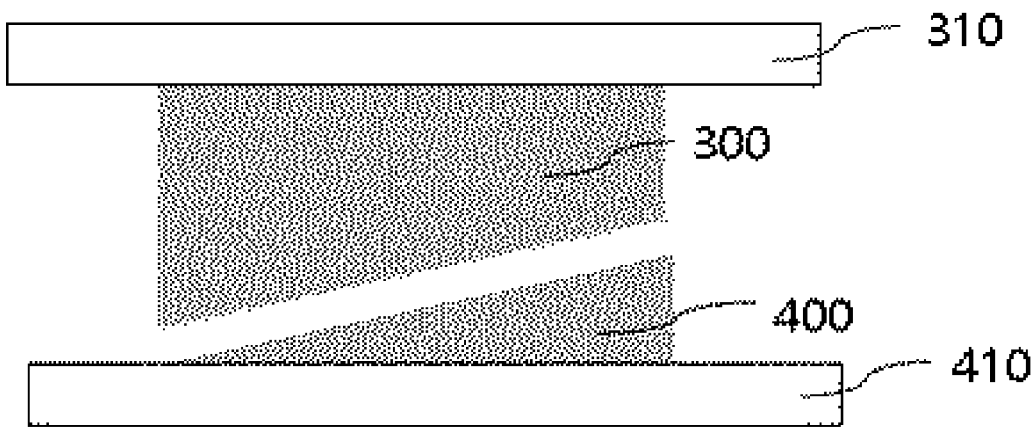
【FIG. 6】
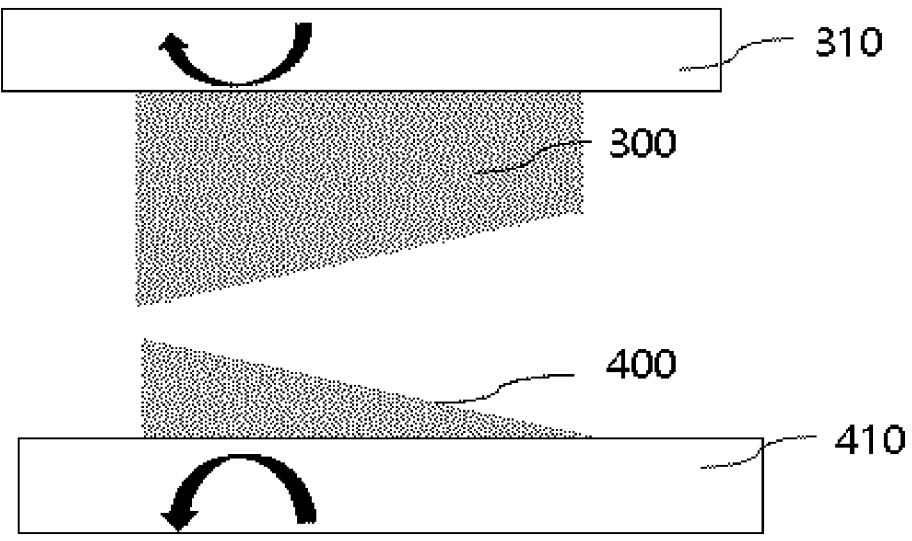

【FIG. 7】
200
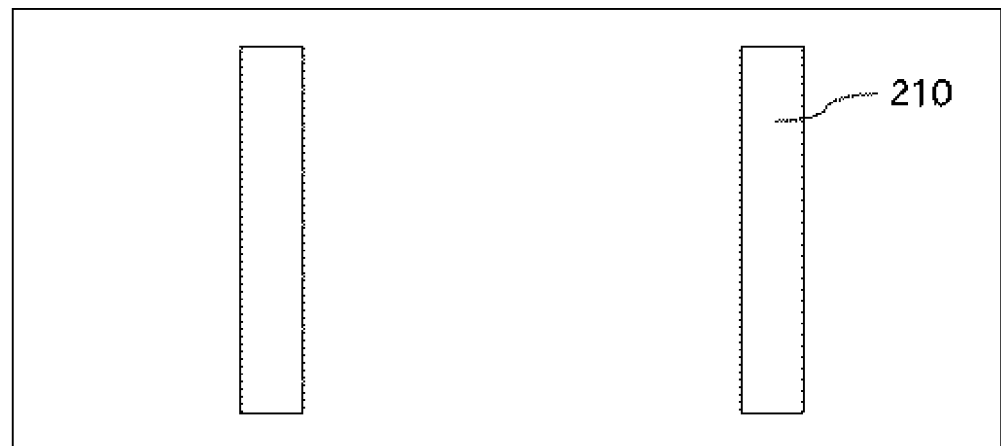
【FIG. 8】
100
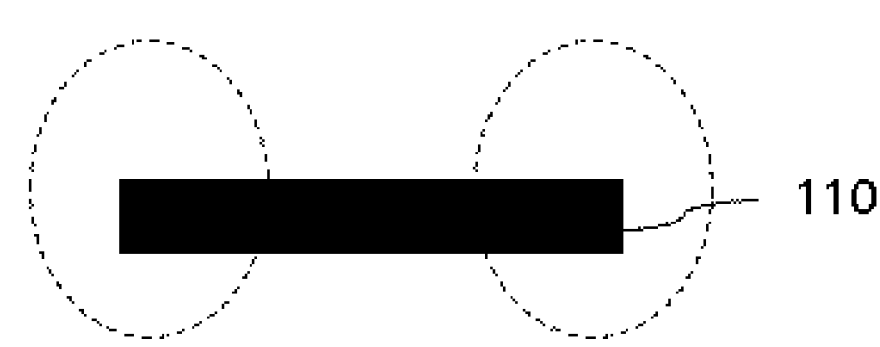

【FIG. 9】
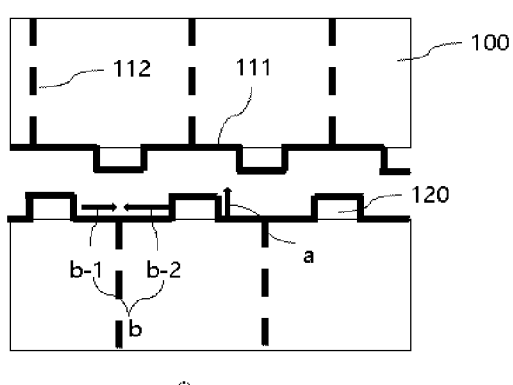
(i)
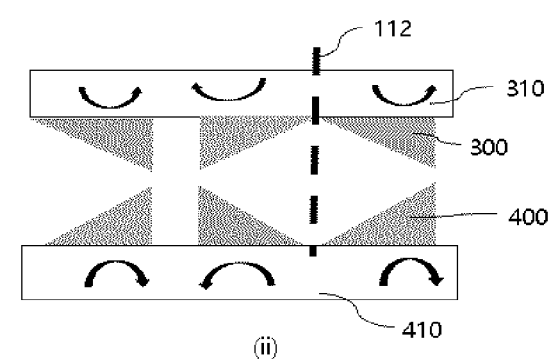
(ii)
【FIG. 10】
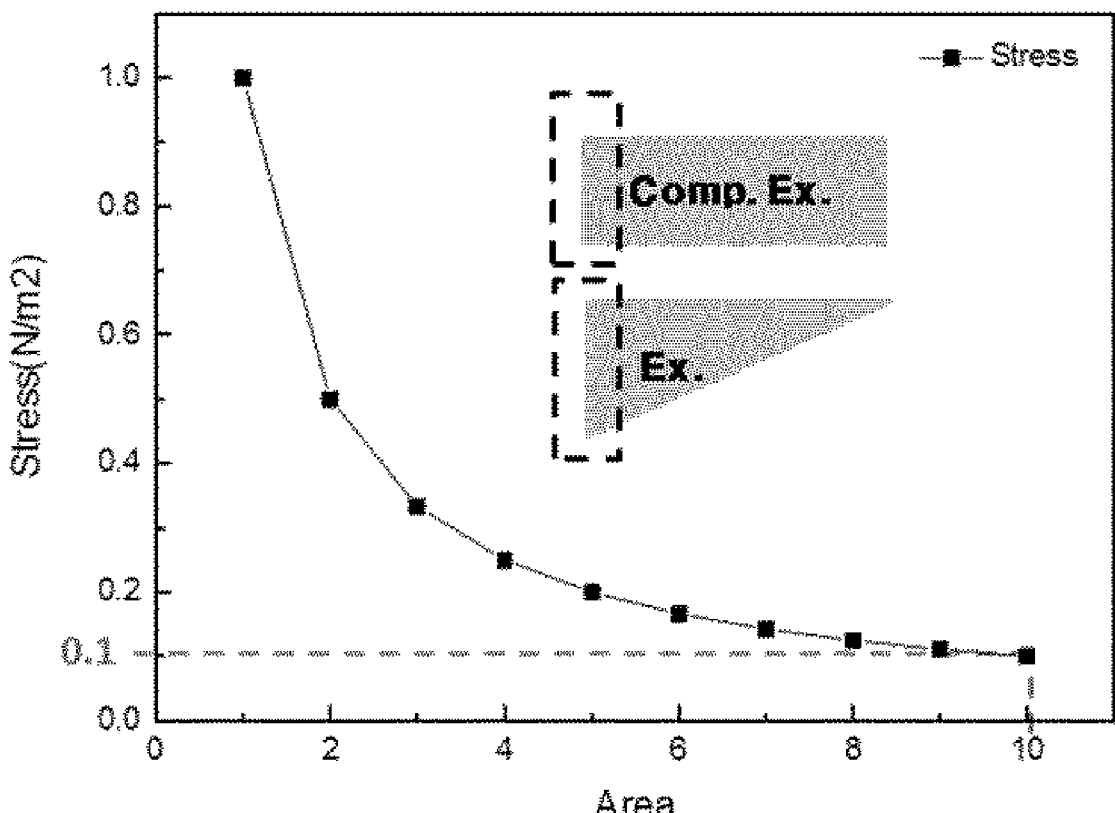

ELECTRODE SHEET CUTTING APPARATUS INCLUDING UPPER CUTTER AND LOWER CUTTER AND ELECTRODE SHEET CUTTING METHOD USING THE SAME

CROSS-REFERENCE TO RELATED APPLICATIONS

This application is a national phase entry under 35 U.S.C. § 371 of International Application No. PCT/KR2021/006217, filed on May 18, 2021, which claims priority to Korean Patent Application No. 10-2020-0060561, filed on May 20, 2020, the disclosures of which are hereby incorporated herein by reference in their entireties.

TECHNICAL FIELD

The present invention relates to an electrode sheet cutting apparatus including an upper cutter and a lower cutter and an electrode sheet cutting method using the same, and more particularly to an electrode sheet cutting apparatus capable of preventing deformation of a cut surface of an electrode sheet and removing a material, such as burr, from the cut surface of the electrode sheet at the time of cutting the electrode sheet and an electrode sheet cutting method using the same.

BACKGROUND ART

In general, a secondary battery includes a positive electrode and a negative electrode, each of which includes a current collector having an active material applied to one surface or opposite surfaces thereof, and a separator. An electrode, such as a positive electrode or a negative electrode, is formed by manufacturing an electrode sheet having an electrode active material applied to one surface or opposite surfaces thereof and cutting the manufactured electrode sheet.

FIG. 1 is a schematic view showing a conventional electrode sheet cutting apparatus and method, and FIG. 2 is an enlarged view showing the section of an electrode sheet cut by the conventional electrode sheet cutting apparatus.

In the conventional electrode sheet cutting apparatus, as shown in FIG. 1, (i) an electrode sheet 10 is disposed on an electrode sheet support 20 having a recess formed at a portion at which an electrode sheet section is provided, and (ii) the electrode sheet 10 is cut using a cutter 30. At this time, the cutter 30 applies force to the recess in the electrode sheet support 20 to cut the electrode sheet 10. In the case in which no recess is provided in the electrode sheet support 20, the cutter 30 applies force above the section of the electrode sheet 10 to cut the electrode sheet 10.

In the conventional electrode sheet cutting apparatus, however, an electrode section 11 may be deformed or a residue, such as burr, is present at the electrode section 11 when the electrode sheet 10 is cut, as shown in FIG. 2.

In the case in which a portion of the electrode sheet 10 is deformed or a residue, such as burr, is present, as shown in FIG. 2, transfer of the electrode sheet 10 may be impeded by the deformed portion or the residue, and when an electrode assembly is formed, density of the electrode assembly is reduced by the deformed portion or the residue, whereby capacity of a battery is reduced. Also, in the case in which a pouch-shaped secondary battery is formed using electrodes, the electrodes may not be stably stacked, whereby it may not be possible to form the battery so as to have a desired shape.

In the drawings of Patent Document 1, cutters configured to cut an electrode plate are located at opposite surfaces of a target. However, cutting is performed from the middle part of the target, and therefore removal of a residue and deformation of the cut surface of an electrode sheet are not considered.

Therefore, an electrode sheet cutting apparatus capable of minimizing a residue due to electrode cutting while minimizing deformation of an electrode sheet at the time of cutting the electrode sheet and an electrode sheet cutting method using the same are required.

Prior Art Document (Patent Document 1) Korean Patent Application Publication No. 2010-0096018

DISCLOSURE

Technical Problem

The present invention has been made in view of the above problems, and it is an object of the present invention to provide an electrode sheet cutting apparatus capable of minimizing deformation of an electrode sheet and an electrode sheet cutting method using the same.

It is another object of the present invention to provide an electrode sheet cutting method capable of minimizing deformation and residue of an electrode sheet due to cutting of the electrode sheet by defining the cutting position and sequence of the electrode sheet.

Technical Solution

In order to accomplish the above objects, an electrode sheet cutting apparatus according to the present invention includes an upper cutter located above an electrode sheet, the upper cutter being configured to cut the electrode sheet; a lower cutter located so as to correspond to the upper cutter, the lower cutter being configured to join the upper cutter so as to cut the electrode sheet; and an electrode sheet support located between the upper cutter and the lower cutter, the electrode sheet support being configured to support the electrode sheet, the electrode sheet support being provided with a through hole formed so as to correspond to a cutting portion at which the electrode sheet is cut as the result of the upper cutter and the lower cutter joining each other.

Also, the upper cutter and the lower cutter may apply an identical force to the electrode sheet.

Also, the upper cutter and the lower cutter may move to the electrode sheet at an identical speed.

Also, the upper cutter and the lower cutter may cut the electrode sheet while widening a cutting range from one side of the cutting portion.

Also, the cutting portion may be widened from a portion adjacent to a middle part of the electrode sheet to a contour portion of the electrode sheet.

The upper cutter and the lower cutter may have an identical shape or a symmetrical shape.

The distance between the upper cutter and the lower cutter before the electrode sheet is cut may gradually increase toward one side.

The electrode sheet may be cut to form an electrode tab protrusion.

At this time, the upper cutter and the lower cutter may start cutting from a position at which the electrode tab protrusion is to be formed.

In addition, the present invention provides an electrode sheet cutting method including (S1) disposing an electrode sheet on an electrode sheet support having a through hole formed at a portion at which the electrode sheet is to be cut; and (S2) cutting the electrode sheet using an upper cutter and a lower cutter.

In step (S2), the electrode sheet may be cut in a longitudinal direction or a direction perpendicular thereto in order to form a single electrode assembly or may be cut in a concave-convex shape in order to form an electrode tab.

In the case in which the electrode tab is formed in step (S2), the upper cutter and the lower cutter may first cut a protrusion of the electrode tab and may last cut a place farthest from the electrode tab protrusion in step (S2).

The place farthest from the electrode tab protrusion may be another cutting portion of the electrode sheet.

In the present invention, one or more constructions that do not conflict with each other may be selected and combined from among the above constructions.

DESCRIPTION OF DRAWINGS

FIG. 1 is a schematic view showing a conventional electrode sheet cutting apparatus and method.

FIG. 2 is an enlarged view showing the section of an electrode cut by the conventional electrode sheet cutting apparatus.

FIG. 3 is a schematic view showing an electrode sheet cutting apparatus and method according to the present invention.

FIG. 4 is a schematic view showing an upper cutter and a lower cutter of an electrode sheet cutting apparatus according to a first embodiment of the present invention.

FIG. 5 is a schematic view showing another shape of the upper cutter and the lower cutter of the electrode sheet cutting apparatus according to the first embodiment.

FIG. 6 is a schematic view showing an upper cutter and a lower cutter of an electrode sheet cutting apparatus according to a second embodiment of the present invention.

FIG. 7 is a schematic view showing the upper part of an electrode sheet support according to the present invention.

FIG. 8 is an enlarged view showing the section of an electrode cut by the electrode sheet cutting apparatus according to the present invention.

FIG. 9 is a schematic view showing the electrode sheet cutting apparatus according to the present invention and an electrode sheet cut thereby.

FIG. 10 is a view showing the result of virtual simulation of force applied to the electrode sheet by the electrode sheet cutting apparatus.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, an electrode sheet cutting apparatus according to the present invention and an electrode sheet cutting method using the same will be described in detail with reference to the accompanying drawings.

FIG. 3 is a schematic view showing an electrode sheet cutting apparatus and method according to the present invention.

The electrode sheet cutting apparatus according to the present invention includes an electrode sheet support 200 configured to support an electrode sheet 100, an upper cutter 300 located above the electrode sheet 100, and a lower cutter 400 located under the electrode sheet support 200, the lower cutter being disposed at the position at which the lower cutter joins the upper cutter 300.

At this time, the electrode sheet support 200 may be provided with a through hole 210, which is formed in a cutting portion at which the electrode sheet 100 is cut as the result of the upper cutter 300 and the lower cutter 400 joining each other, such that the upper cutter 300 and the lower cutter 400 join each other while cutting the electrode sheet 100.

The upper cutter 300 is connected to an upper pressing portion 310, and the lower cutter 400 is connected to a lower pressing portion 410 so as to be moved at predetermined force and speed. The upper cutter 300 applies upper pressing force F1 above the electrode sheet 100, and the lower cutter 400 applies lower pressing force F2 under the electrode sheet 100. The lower cutter 400 cuts the electrode sheet 100 through the through hole 210 and joins the upper cutter 300.

The upper pressing force F1 and the lower pressing force F2 may be equal to each other in order to prevent deformation of the electrode sheet 100. In the case in which the force of the upper cutter 300 applied to the electrode sheet 100 and the force of the lower cutter 400 applied to the electrode sheet 100 are equal to each other, a danger of the electrode sheet 100 being deformed upwards or downwards is reduced.

In addition, the upper cutter 300 and the lower cutter 400 may be spaced apart from the electrode sheet 100 by the same distance and may reach the electrode sheet at the same speed. As a result, the upper cutter 300 or the lower cutter 400 may be prevented from early reaching and cutting the electrode sheet 100, whereby it is possible to inhibit deformation of the electrode sheet 100.

FIG. 4 is a schematic view showing an upper cutter and a lower cutter of an electrode sheet cutting apparatus according to a first embodiment of the present invention, and FIG. 5 is a schematic view showing another shape of the upper cutter and the lower cutter of the electrode sheet cutting apparatus according to the first embodiment.

In the electrode sheet cutting apparatus according to the first embodiment of the present invention, the upper cutter 300 and the lower cutter 400 may have the same shape. When viewed from the side, each of the upper cutter 300 and the lower cutter 400 may have a rectangular shape or a parallelogram shape, as shown in FIG. 4, or each of the upper cutter 300 and the lower cutter 400 may have a right triangular shape in which one side of each of the upper cutter 300 and the lower cutter 400 protrudes more than the other thereof, as shown in FIG. 5. However, the shape of each of the upper cutter and the lower cutter is not restricted as long as it is possible to uniformly cut the electrode sheet 100.

The inter-cutter distance B between the upper cutter 300 and the lower cutter 400 before the electrode sheet 100 is cut may gradually increase from one end to the other end thereof, as shown in FIG. 4. That is, the distance at which the upper cutter 300 and the lower cutter 400 join each other first may be very short, and the inter-cutter distance B may gradually increase in a cutting direction A.

The upper cutter 300 and the lower cutter 400 disposed as described above may cut the electrode sheet 100 while extending a cutting range from one side of the cutting portion. That is, the upper cutter 300 and the lower cutter 400 may be operated like a fodder chopper. As a result, a movement range of each of the upper cutter 300 and the lower cutter 400 at one corner of the cutting portion and a movement range of each of the upper cutter and the lower cutter at the other corner of the cutting portion may be different from each other.

In the case in which the electrode sheet cutting apparatus according to the present invention performs cutting while extending a range from one side to the other side of the cutting portion, as described above, force applied to the electrode sheet is increased, whereby cutting is easily performed, and deformation of the electrode sheet is reduced. In addition, since cutting is performed while extending the range from one side to the other side, foreign matter generated due to cutting moves to the other side.

At this time, in order to easily remove the foreign matter, it is preferable for the cutting portion to be widened from a portion adjacent to a middle part of the electrode sheet 100 to a contour portion of the electrode sheet, i.e. it is preferable that the upper cutter 300 and the lower cutter 400 join each other first at the middle part of the electrode sheet 100 and then the cutting portion be widened to the contour portion of the electrode sheet 100.

In the electrode sheet cutting apparatus according to the present invention, after the electrode sheet is cut as the result of being operated like the fodder chopper, the inter-cutter distance B decreases until the entire surfaces of the upper cutter 300 and the lower cutter 400 join each other, as shown in FIG. 4. Subsequently, the entire surfaces of the upper cutter 300 and the lower cutter 400 join each other to cut the cutting portion, and then the upper cutter 300 and the lower cutter 400 move so as to become distant from the electrode sheet 100.

That is, an electrode sheet cutting method according to the present invention may mainly include (S1) a step of disposing an electrode sheet 100 on an electrode sheet support 200 having a through hole 210 formed at a portion at which the electrode sheet 100 is to be cut and (S2) a step of cutting the electrode sheet 100 using an upper cutter 300 and a lower cutter 400. After step (S2), a step of removing the upper cutter 300 and the lower cutter 400 from the electrode sheet 100 after cutting of the electrode sheet 100 is completed may be performed.

FIG. 6 is a schematic view showing an upper cutter and a lower cutter of an electrode sheet cutting apparatus according to a second embodiment of the present invention.

The upper cutter 300 and the lower cutter 400 of the electrode sheet cutting apparatus according to the second embodiment of the present invention may be disposed in a symmetrical fashion, whereby the inter-cutter distance may be the shortest at one corner of each of the upper cutter 300 and the lower cutter 400 and the inter-cutter distance may be the longest at the other corner of each of the upper cutter and the lower cutter. That is, the upper cutter 300 and the lower cutter 400 may be disposed in a symmetrical fashion while each of the upper cutter and the lower cutter has a right triangular shape.

After the upper cutter 300 and the lower cutter 400 come into contact with the electrode sheet 100 first at one corner of each thereof, the shape or position of the upper cutter 300 and the lower cutter 400 may be changed.

As an example, the angle of the upper cutter 300 may be changed while the upper cutter 300 enters the upper pressing portion 310, to which the upper cutter 300 is connected, and the angle of the lower cutter 400 may also be changed so as to correspond to the upper cutter 300 while the lower cutter 400 enters the lower pressing portion 410, to which the lower cutter 400 is connected. Finally, edges of the upper cutter 300 and the lower cutter 400 may come into complete contact with each other, as shown in FIG. 4.

FIG. 7 is a schematic view showing the upper part of an electrode sheet support according to the present invention.

The electrode sheet support 200 according to the present invention is provided with a through hole 210 corresponding to a cutting portion at which an electrode sheet is cut, as shown in FIG. 7. The through hole 210 is an empty hole configured to allow the lower cutter 400 to extend therethrough. The size of the through hole 210 is set in consideration of the radius of the lower cutter 400 due to movement or change in angle thereof. At this time, in order to prevent damage to the lower cutter 400 due to movement or change in angle thereof, an electrode sheet damage prevention portion may be provided in the through hole 210. It is preferable for the electrode sheet damage prevention portion to be made of a flexible material in order to protect the electrode sheet while not damaging the edge of the lower cutter 400.

FIG. 8 is an enlarged view showing the section of an electrode sheet cut by the electrode sheet cutting apparatus according to the present invention.

An electrode section 110 according to the present invention means the point of the electrode sheet 100 at which the upper cutter and the lower cutter join each other, i.e. the point of the electrode sheet at which the electrode sheet is cut, as shown in FIG. 8.

The electrode section 110 may be divided into an electrode tab section and an electrode sheet section depending on the portion that is cut. The cutting sequence or cutting start region of the electrode sheet 100 may be changed depending on the kind of the electrode section 110.

FIG. 9 is a schematic view showing the electrode sheet cutting apparatus according to the present invention and an electrode sheet cut thereby.

As shown in FIG. 9(*i*), in order to obtain a plurality of electrode tab portions 120 from a single electrode sheet 100, the single electrode sheet 100 may be cut to form the plurality of electrode tab portions 120.

In the case in which the electrode sheet 100 is manufactured, as described above, the electrode sheet 100 may be cut in a longitudinal direction or a direction perpendicular thereto in order to form a single electrode assembly or may be cut in a concave-convex shape in order to form an electrode tab portion 120 in (S2) the step of cutting the electrode sheet 100.

When an electrode tab section 111 for electrode tab cutting is formed, it is preferable to perform cutting first in an electrode tab protrusion cutting direction a and to perform cutting in a direction perpendicular to the protruding direction a of the electrode tab portion 120, i.e. an electrode tab concave cutting direction b, which is a direction toward the electrode sheet 100, in order to minimize deformation of the electrode sheet 100 and to easily remove foreign matter generated due to cutting. In addition, it is preferable to first cut the place at which the electrode tab portion 120 protrudes, i.e. the place closest to the electrode tab protrusion, and to last cut the place farthest from the electrode tab protrusion in the electrode tab concave cutting direction b. That is, in a left electrode tab concave cutting direction b-1, which is one of the electrode tab concave cutting direction b, it is preferable to perform cutting from the left side to the right side, since the electrode tab portion 120 is formed at the left side of the place at which cutting starts. Also, in a right electrode tab concave cutting direction b-2, which is the other of the electrode tab concave cutting direction, it is preferable to perform cutting from the right side to the left side, since the electrode tab portion 120 is formed at the right side of the place at which cutting starts.

The left electrode tab concave cutting direction b-1 and the right electrode tab concave cutting direction b-2 join each other at the place farthest from the place at which the electrode tab portion 120 is formed, i.e. the center between the electrode tab portions 120. At this region, the electrode sheet 100 is cut in a direction perpendicular to the electrode tab concave cutting direction b to form a unit cell electrode for an electrode assembly.

To this end, the electrode sheet cutting apparatus according to the present invention includes an upper cutter 300, an upper pressing portion 310, a lower cutter 400, and a lower pressing portion 410, as shown in FIG. 9(ii). When the electrode sheet is cut, therefore, the upper cutter 300 and the lower cutter 400 are deformed.

At this time, it is preferable for the most protruding portions of the upper cutter 300 and the lower cutter 400 to be disposed at the place closest to the position at which the electrode tab portion 120 is to be formed depending on the position of the electrode tab portion 120, and it is preferable for the upper cutter 300 and the lower cutter 400 to be disposed so as to be most deeply recessed at the electrode sheet section 112 cut to form the unit cell electrode.

FIG. 10 is a view showing the result of virtual simulation of force applied to the electrode sheet by the electrode sheet cutting apparatus.

Force applied to the electrode sheet by the electrode sheet cutting apparatus decreases with increasing contact area between the electrode sheet cutting apparatus and the electrode sheet.

That is, the conventional electrode sheet cutting apparatus uniformly contacts the electrode sheet over the entire area (area=10), whereby force applied to the electrode sheet decreases (stress=0.1), as shown in FIG. 10. In contrast, a portion (area<10) of the electrode sheet cutting apparatus according to the present invention comes into contact with the electrode sheet first, whereby force applied to the electrode sheet increases (stress>0.1), as shown in FIG. 10. As a result, the electrode sheet is rapidly cut, and deformation of the electrode sheet is reduced.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS 10, 100: Electrode sheets
11, 110: Electrode sections 120: Electrode tab portion
111: Electrode tab section
112: Electrode sheet section
200: Electrode sheet support
210: Through hole
30: Cutter
300: Upper cutter
310: Upper pressing portion
400: Lower cutter
410: Lower pressing portion
F1: Upper pressing force
F2: Lower pressing force
A: Cutting direction
B: Inter-cutter distance
a: Electrode tab protrusion cutting direction
b: Electrode tab concave cutting direction
b-1: Left electrode tab concave cutting direction
b-2: Right electrode tab concave cutting direction

INDUSTRIAL APPLICABILITY

An electrode sheet cutting apparatus and an electrode sheet cutting method according to the present invention are capable of minimizing deformation of an electrode sheet. In addition, it is possible to easily remove foreign matter generated due to cutting of the electrode sheet such that an electrode is not affected by the foreign matter.

In addition, it is possible to cut the electrode sheet so as to have a regular shape, whereby it is possible to uniformly stack electrodes, and it is possible to provide a regular shape in the case in which the electrodes are stacked in a pouch-shaped case. Furthermore, the electrodes are stacked at a uniform height, whereby it is possible to improve density and capacity of the electrode.

In addition, cutting is performed from one side, whereby a residue generated as the result of electrode cutting moves to a specific portion, and therefore it is possible to easily remove the residue.

The invention claimed is:

1. An electrode sheet cutting apparatus comprising:
an upper cutter configured to be located above an electrode sheet, the upper cutter being configured to cut the electrode sheet;
a lower cutter facing the upper cutter, the lower cutter being configured to engage the upper cutter to cut the electrode sheet; and
an electrode sheet support located between the upper cutter and the lower cutter, the electrode sheet support being configured to support the electrode sheet, the electrode sheet support being provided with a through hole configured to overlie a cutting portion of the electrode sheet at which the upper cutter and the lower cutter are configured to engage each other,
wherein the upper cutter and the lower cutter are each configured to cut the electrode sheet with increasing lengths of the upper cutter and the lower cutter contacting the electrode sheet as cutting proceeds from first ends of the upper cutter and the lower cutter to second ends of the upper cutter and the lower cutter in a direction parallel to a longitudinal direction of the upper cutter and the lower cutter,
wherein the apparatus is configured to cut the electrode sheet to form an electrode tab protrusion,
wherein the upper cutter and the lower cutter are configured to first cut the electrode sheet at a position at which the electrode tab protrusion is to be formed, and to last cut the electrode sheet at a position farthest from the electrode tab protrusion, and wherein the apparatus is configured to apply a stress to the electrode sheet between 0.1 N/m² and 1.0 N/m², wherein the apparatus is configured to cut the electrode sheet with increasing lengths of the upper cutter and the lower cutter contacting the electrode sheet from a portion adjacent to a middle part of the electrode sheet at the first ends of the upper cutter and the lower cutter to a peripheral portion of the electrode sheet at the second ends of the upper cutter and the lower cutter, and wherein the middle part of the electrode sheet is spaced apart from all peripheral edges of the electrode sheet, and the first ends of the upper cutter and the lower cutter overlie the through hole of the electrode sheet support, the through hole being in a middle part of the electrode sheet support that is spaced apart from all peripheral edges of the electrode sheet support.

2. The electrode sheet cutting apparatus according to claim 1, wherein the upper cutter and the lower cutter are each configured to apply an identical force to opposite surfaces of the electrode sheet.

3. The electrode sheet cutting apparatus according to claim 1, wherein the upper cutter and the lower cutter are each configured to move towards opposite surfaces of the electrode sheet at an identical speed.

4. The electrode sheet cutting apparatus according to claim 1, wherein the upper cutter and the lower cutter each have an identical shape or a symmetrical shape to one another.

5. The electrode sheet cutting apparatus according to claim 4, wherein when the upper cutter and the lower cutter are in an initial position, a distance between the upper cutter and the lower cutter incrementally increases from one side of the apparatus toward another side of the apparatus.

6. An electrode sheet cutting method comprising:

disposing the electrode sheet on the electrode sheet support, such that the through hole of the electrode sheet support overlies a portion of the electrode sheet at which the electrode sheet is to be cut; and cutting the electrode sheet using the upper cutter and the lower cutter according to claim 1.

7. The electrode sheet cutting method according to claim 6, wherein, during the cutting, the electrode sheet is cut in a longitudinal direction or a direction perpendicular thereto to form a single electrode assembly or is cut in a concave-convex shape to form an electrode tab.

8. The electrode sheet cutting method according to claim 7, wherein the electrode tab is formed during the cutting, and the upper cutter and the lower cutter first cut a protrusion of the electrode tab and then cut a place on the electrode sheet farthest from the protrusion of the electrode tab.

9. The electrode sheet cutting method according to claim 8, wherein the place on the electrode sheet farthest from the protrusion of the electrode tab is another cutting portion of the electrode sheet.

* * * * *